US012600314B2

(12) United States Patent　　　(10) Patent No.:　US 12,600,314 B2

Jo　　　(45) Date of Patent:　Apr. 14, 2026

(54) AIRBAG HOUSING

(71) Applicant: HYUNDAI MOBIS CO., LTD., Seoul (KR)

(72) Inventor: Kum Ho Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/043,824

(22) Filed: Feb. 3, 2025

(65) Prior Publication Data

US 2025/0388186 A1　　Dec. 25, 2025

(30) Foreign Application Priority Data

Jun. 19, 2024　(KR) ........................ 10-2024-0079551

(51) Int. Cl.
*B60R 21/215*　　　(2011.01)

(52) U.S. Cl.
CPC .................................. *B60R 21/215* (2013.01)

(58) Field of Classification Search
CPC ........................................... B60R 2021/21506
See application file for complete search history.

(56) References Cited

U.S. PATENT DOCUMENTS 6,942,244 B2 * 9/2005 Roychoudhury ..... B60R 21/217
280/728.3
8,641,082 B2 * 2/2014 Vigeant ................. B60R 21/206
280/728.2

10,933,835 B2 * 3/2021 Lee ...................... B60R 21/2165
11,511,698 B1 * 11/2022 Ibarra .................. B60R 21/2165
2014/0077479 A1 * 3/2014 Kim ...................... B29C 45/1671
280/728.3
2020/0047707 A1 * 2/2020 Moon .............. B60R 21/23138

FOREIGN PATENT DOCUMENTS

DE　　102010016749 A1 * 11/2011 ........... B60R 21/055
DE　　102010048318 B4 * 12/2014 ........... B60R 21/055
DE　　202019104057 U1 * 9/2019 ......... B60R 21/207
EP　　　2783923 B1 * 5/2016 ........ B60R 21/2037
EP　　　3385128 A1 * 10/2018 ............. B60R 21/20
KR　　20040079706 A * 9/2004
KR　　100510363 B1 * 8/2005
KR　　20240048669 A * 4/2024
KR　　102731811 B1 * 11/2024
KR　　102779058 B1 * 3/2025
WO　WO-2021251677 A1 * 12/2021

* cited by examiner

*Primary Examiner* — Nicole T Verley
(74) *Attorney, Agent, or Firm* — NSIP Law

(57)　　　　ABSTRACT

An airbag housing includes a first cover to accommodate an airbag cushion therein, the first cover including first fastening portions formed along a circumference of the first cover, and a second cover to cover the airbag cushion and including second fastening portions formed along a circumference of the second cover for engaging with the first fastening portions and fasten to the first cover, a fracture part formed in a portion of the second cover to reduce rigidity, and fracture dispersion parts formed at ends of the fracture part, the fracture dispersion parts to disperse fracture force to prevent cutting of other portions of the second cover other than the fracture part.

13 Claims, 4 Drawing Sheets

AIRBAG HOUSING

CROSS-REFERENCE TO RELATED APPLICATION(S)

This application claims the benefit under 35 USC § 119 of Korean Patent Application No. 10-2024-0079551 filed on Jun. 19, 2024, in the Korean Intellectual Property Office, the disclosure of which is hereby incorporated herein by reference in its entirety for all purposes.

BACKGROUND

1. Field

The present disclosure relates to an airbag housing that improves assemblability of an airbag housing product while reducing manufacturing costs.

2. Description of the Related Art

In an airbag housing, one side edge of an upper cover and one side edge of a lower cover are connected by a hinge structure, and the other side edge of the upper cover and the other side edge of the lower cover are fastened by a hook structure.

That is, when an airbag cushion is accommodated in the lower cover while the upper cover is opened, and then the upper cover is closed, the upper cover is rotated about a hinge and a hook formed on the upper cover passes through a hook hole formed in the lower cover so that the upper cover and the lower cover are engaged, and thereby, the airbag housing is closed.

However, in this closed structure of the airbag housing, if the thickness of a hinge area becomes excessive due to a difference between the 3D design shape of the hinge area and an actual product shape, the upper cover and the lower cover may not be properly engaged with each other and may fall apart.

The matters described in this Background section are only for enhancement of understanding of the background of the disclosure, and should not be taken as an acknowledgement that they correspond to prior art already known to those skilled in the art.

SUMMARY

Therefore, the present disclosure has been made in view of the above problems, and it is an object of the present disclosure to provide an airbag housing that is assembled by coupling two independently separated covers to improve assemblability of an airbag housing product and reduce manufacturing costs.

Technical problems to be achieved in the present disclosure are not limited to the technical problems mentioned above, other technical problems not mentioned may be clearly understood by those skilled in the art to which the present disclosure pertains from the following description.

In a general aspect of the disclosure, an airbag housing includes: a first cover configured to accommodate an airbag cushion therein, the first cover including first fastening portions formed along a circumference of the first cover; and a second cover configured to cover the airbag cushion and including: second fastening portions formed along a circumference of the second cover and configured to engage with the first fastening portions and fasten to the first cover; a fracture part formed in a portion of the second cover to reduce rigidity; and fracture dispersion parts formed at ends of the fracture part, the fracture dispersion parts configured to disperse fracture force to prevent cutting of other portions of the second cover other than the fracture part.

Each of the fracture dispersion parts may be formed in a shape of a hole configured to penetrate the second cover.

Each of the fracture dispersion parts may be formed in a shape of a circular hole.

A thickness of portions of the second cover where the fracture distribution parts are formed may be greater than a thickness of a remaining portion of the second cover.

The first cover may further include outer walls formed around the circumference thereof and the circumference of the second cover, wherein the first fastening portions and the second fastening portions may be respectively formed on the outer walls of the first cover and the outer walls of the second cover, and wherein the first cover may further include inner walls provided inside the outer walls so that the airbag cushion is accommodated in a space created by the inner walls.

The inner walls may be disposed inside fastening areas between the first fastening portions and the second fastening portions.

The inner walls may be disposed adjacent to the first fastening portions and the second fastening portions.

The inner walls may be formed to have a height greater than that of the outer walls of the first cover and the outer walls of the second cover.

The inner walls may be formed in a shape of a plate so that one end of each of the inner walls is fixed to an inner surface of one of the first cover and the second cover, and a remaining end of each of the inner walls protrudes toward a remaining one of the first cover, wherein the second cover may be configured to face the inner walls.

The inner walls may be supported vertically on an inner surface of the first cover and an inner surface of the second cover.

The second fastening portions of the second cover may engage with the first fastening portions of the first cover as a hook fastening structure.

The first fastening portions may include hooks and the second fastening portions may include hook groves, or the first fastening portions may include hook grooves and the second fastening portions may include hooks, wherein the first fastening portions are fastened to the second fastening portions to form the hook fastening structure.

The fracture part may be configured as a tear line shaped as a broken line to reduce rigidity of the fracture part.

The fracture part may have a U-shape.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view showing the assembled state of an airbag housing according to one embodiment of the present disclosure;

FIG. 3 is a cross-sectional view taken along line A-A of FIG. 2; and

DETAILED DESCRIPTION

Figure 2:
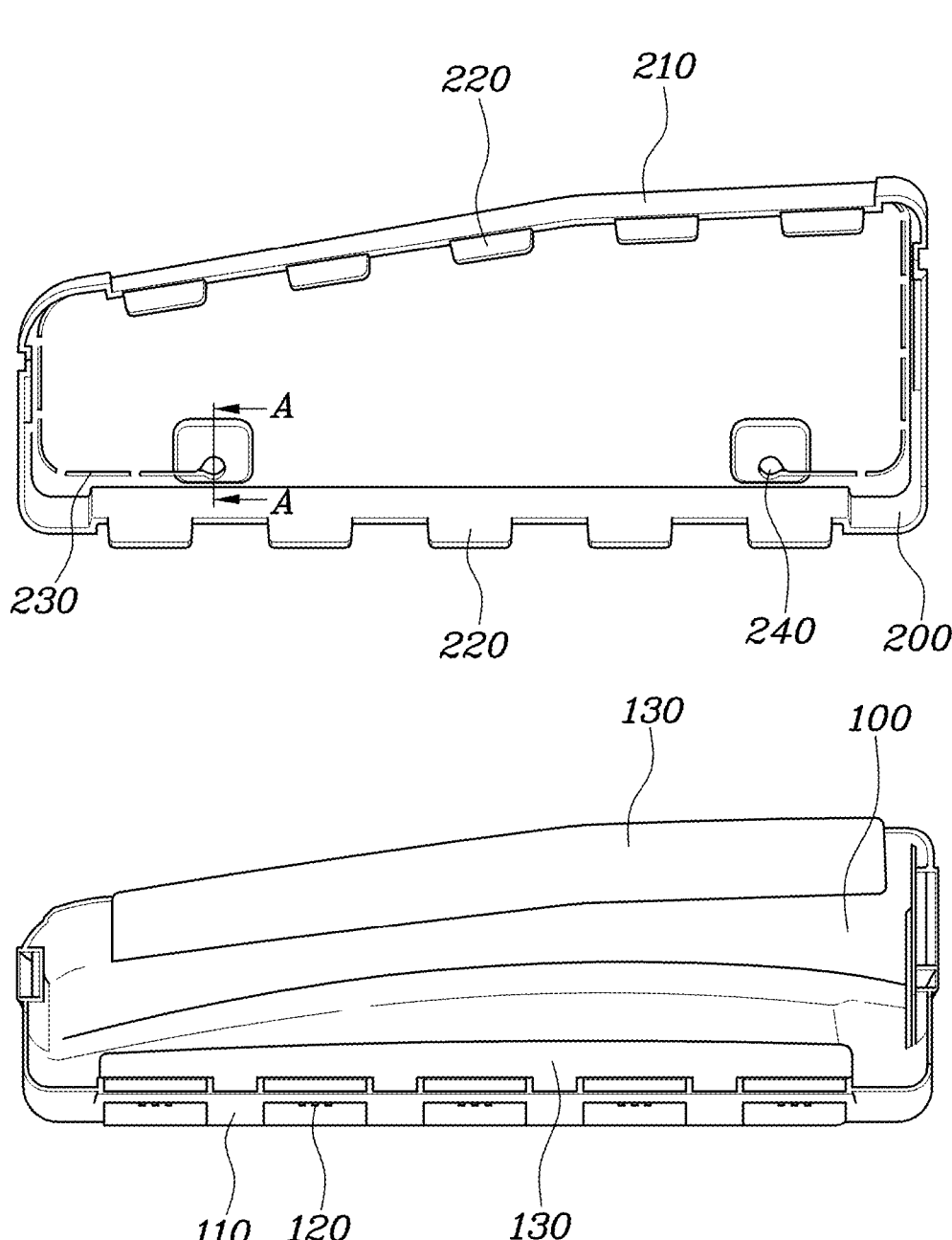
FIG. 2 is a view showing a state in which a first cover and a second cover according to the present disclosure are separated from each other.

In the following description of embodiments disclosed in the present disclosure, a detailed description of known functions and configurations incorporated herein will be omitted when it may make the subject matter of the present disclosure rather unclear. In addition, the accompanying drawings are only for ease of understanding the embodiments disclosed in the present disclosure, and the technical idea disclosed in the present disclosure is not limited by the accompanying drawings and should be understood to include all changes, equivalents or substitutes included in the spirit and technical scope of the present disclosure.

In the following description of the embodiments, terms, such as "first" and "second", may be used to describe various elements but do not limit the elements. These terms are used only to distinguish one element from other elements.

Singular expressions may encompass plural expressions, unless they have clearly different contextual meanings.

In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same.

The suffixes "module" and "part" for components used in the following description are given or used interchangeably only for ease of preparing the description of the present disclosure, and do not have distinct meanings or roles in themselves.

When an element or layer is referred to as being "connected to" or "coupled to" another element or layer, it may be directly connected to or coupled to the other element or layer, or intervening elements or layers may be present. In contrast, when an element is referred to as being "directly connected to" or "directly coupled to" another element or layer, there may be no intervening elements or layers present.

Hereinafter, the embodiments disclosed in the present disclosure will be described in detail, and the same or similar components in different drawings will be indicated by the same reference numerals and redundant descriptions thereof will be omitted.

An airbag housing according to the present disclosure includes a first cover 100 configured to accommodate an airbag cushion therein and including first fastening portions 120 formed along the circumference of the first cover 100, and a second cover 200 provided in a shape of covering the airbag cushion and including second fastening portions 220 formed along the circumference of the second cover 200 to be engaged with the first fastening portions 120 and fastened thereto in a hook fastening structure, a fracture part 230 formed in a portion of the second cover 200 to be cut due to relatively low rigidity, and fracture dispersion parts 240 formed at ends of the fracture part 230 and configured to disperse fracture force to prevent cutting of other portions of the second cover 200 than the fracture part 230.

Figure 1:
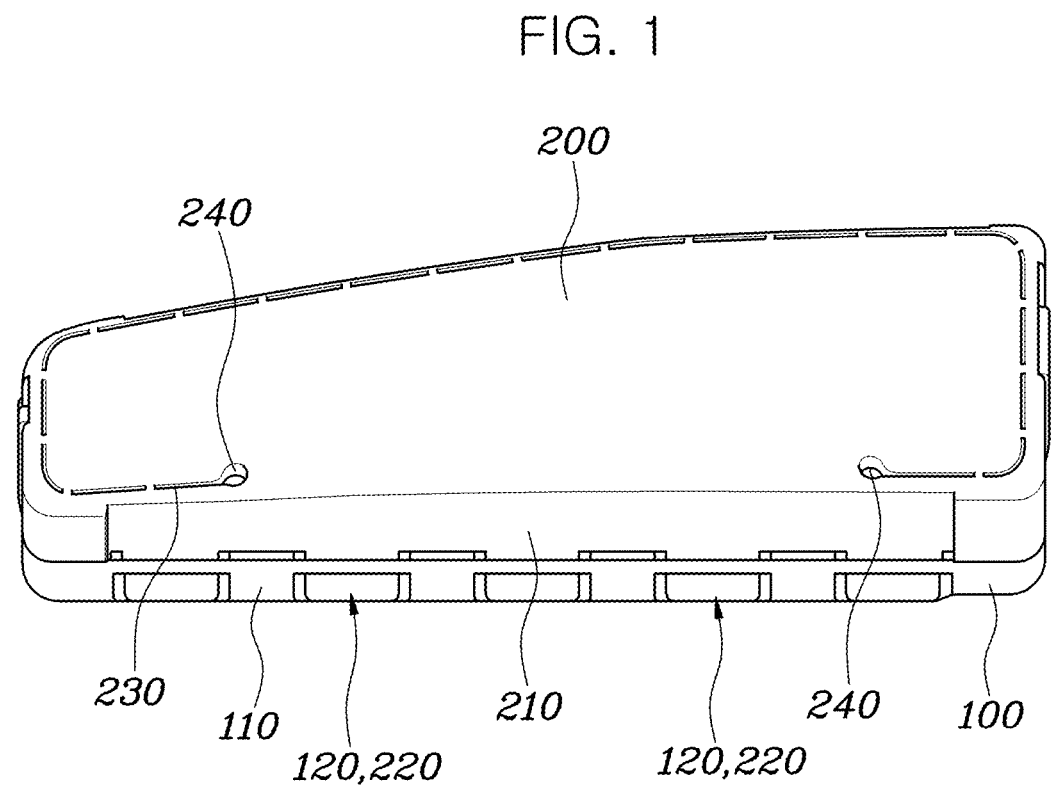

Referring to FIGS. 1 and 2, a portion of the first cover 100 formed in the shape of a rectangular plate becomes the upper surface of the airbag housing, and first outer walls 110 are formed along the front, rear, left, and right circumferential surfaces of the plate by folding so that the first cover 100 is formed in a rectangular enclosure shape.

In addition, the first fastening portions 120 are formed along the first outer walls 110, and in this case, a plurality of first fastening portions 120 may be formed at regular intervals on relatively long first outer walls 110 among the first outer walls 110.

Here, the first fastening portion 120 may be one of a hook and a hook groove forming a hook fastening structure.

Further, a portion of the second cover 200 formed in the shape of a rectangular plate becomes the lower surface of the airbag housing, and second outer walls 210 are formed along the front, rear, left, and right circumferential surfaces of the plate by folding so that the second cover 200 is formed in a rectangular enclosure shape.

The second cover 200 is formed in the enclosure shape corresponding to the first cover 10, and the second portions 220 are formed at positions corresponding to the first fastening portions 120 along the second outer walls 210.

If the first fastening portions 120 are hooks, the second fastening portions 220 may be formed as hook grooves so that the first fastening portions 120 and the second fastening portions 220 are fastened by the hook fastening structure.

The fracture part 230 is formed as a tear line in the shape of a broken line so that the rigidity of the fracture part 230 is low.

The fracture part 230 is formed in a "U" shape along three sides except at least one side among the four sides forming the circumference of the plate bordering the first outer walls 110 of the first cover 100.

Accordingly, when the airbag cushion accommodated in the airbag housing is deployed, the fracture part 230 is cut by the deployment pressure of the airbag cushion and the upper surface of the airbag housing is rotated about the side, where the fracture part 230 is not formed, to be opened, and thereby, the airbag cushion may be expanded and deployed through the opened portion.

Particularly, the fracture dispersion parts 240 having a shape that disperses the fracture force are formed at both ends of the fracture part 230.

Accordingly, the fracture force from the fracture part 230 is dispersed in the fracture dispersion parts 240, thereby preventing the remaining portion of the second cover 200 that comes into contact with the fracture dispersion parts 240 from being cut.

As such, the present disclosure allows the upper surface of the airbag housing to be rotated in a hinge structure by the fracture part 230 to be stably opened, thereby improving the deployment performance of the airbag cushion folded in the airbag housing.

Particularly, the first cover 100 and the second cover 200 are formed independently and separately, and the airbag housing is assembled through the fastening structure of these covers 100 and 200, thereby improving assemblability of an airbag housing product and reducing manufacturing costs.

In addition, the fracture dispersion parts 240 may be formed in the shape of a hole penetrating the second cover 200.

The fracture dispersion parts 240 may be formed in the shape of a circular hole.

Specifically, the fracture dispersion parts 240 may be formed in the shape of a hole vertically penetrating the plate portion of the second cover 200 that serves as the upper surface of the airbag housing.

Further, the fracture dispersion parts 240 may be formed at the ends of the fracture part 230 to have a greater diameter than the width of the fracture part 230, i.e., the size of the fracture part 230 in the width direction.

Therefore, the fracture force transmitted from the fracture part 230 to the fracture dispersion parts 240 is distributed along the inner surfaces of the holes forming the fractur dispersion parts 240, thereby preventing the portions of the second cover 240 that come into contact with the inner surfaces of the holes from being cut.

Further, the thickness t1 of portions of the second cover 200 where the fracture distribution parts 240 are formed may be greater than the thickness t2 of the remaining portion of the second cover 200.

Figure 3:
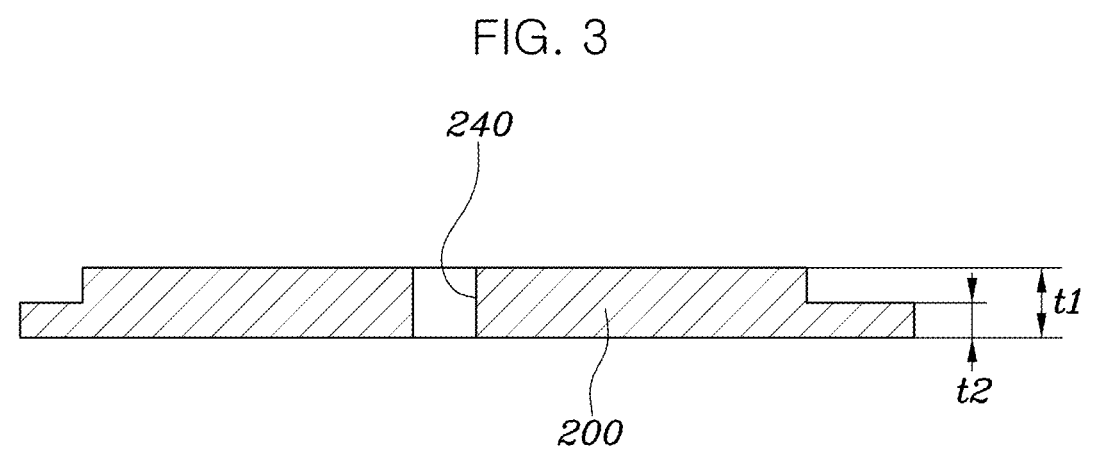

Referring to FIGS. 2 and 3, among the plate portion of the second cover 200 that serves as the upper surface of the airbag housing, the thickness t1 of some areas of the plate portion including the fracture distribution parts 240 is greater than the thickness t2 of the remaining area of the plate portion.

Therefore, the thickness of the inner surfaces of the holes forming the fracture dispersion parts 240 is relatively increased, the rigidity of the inner surfaces of the holes is strengthened, and cutting of the portions of the second cover 200 that come into contact with the inner surfaces of the holes is more reliably prevented.

Further, in the present disclosure, the first outer walls 110 and the second outer walls 210 are formed around the circumference of the first cover 100 and the circumference of the second cover 200, the first fastening portions 120 and the second fastening portions 220 are formed on the first outer walls 110 of the first cover 100 and the second outer walls 210 of the second cover 200, respectively, and inner walls 130 are provided inside the outer walls 110 and 210 so that the airbag cushion is accommodated in a space created by the inner walls 130.

Figure 4:
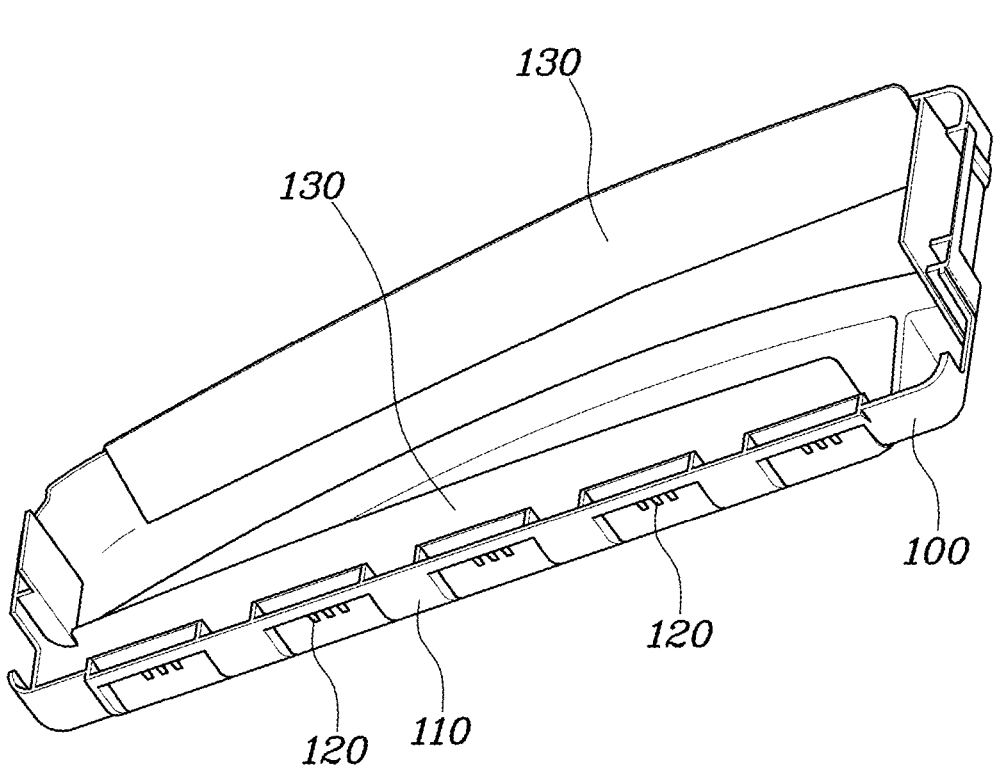
FIG. 4 is a view for explaining inner walls according to the present disclosure.

Referring to FIGS. 2 and 4, the inner walls 130 are provided in areas facing the first outer walls and the second outer walls in a space formed between the first cover 100 and the second cover 200.

The inner walls 130 may be disposed in the front, rear, left, and right sides of the space within the airbag housing, respectively, to define a predetermined storage space, and the folded airbag cushion may be accommodated in the storage space.

Therefore, not only in the folded state of the airbag cushion, but also during the process of deploying the airbag cushion, the inner walls 130 may prevent the airbag cushion from being separated to the outside of the airbag housing, and may also guide a path along which the airbag cushion is deployed to improve deployment of the airbag cushion.

In addition, the inner walls 130 may be disposed inside fastening areas between the first fastening portions 120 and the second fastening portions 220.

Furthermore, the inner walls 130 may be disposed adjacent to the first fastening portions 120 and the second fastening portions 220.

For example, the first fastening portions 120 and the second fastening portions 220 may be formed on the left and right outer walls 110 and 210 of the first cover 100 and the second cover 200, respectively, and the first fastening portions 120 and the second fastening portions 220 may also be formed on the front and rear outer walls 110 and 210 of the first cover 100 and the second cover 200, respectively.

Therefore, the inner walls 130 are provided in inner areas adjacent to the left and right outer walls 110 and 210, and the inner walls 130 are also provided in inner areas adjacent to the front and rear outer walls 110 and 210.

Accordingly, when the airbag cushion is deployed, the deployment force of the airbag cushion is first transmitted to the inner walls 130, and thereby, load transmitted to the fastening areas between the first fastening portions 120 and the second fastening portions 220 is greatly reduced, fastening force between the first fastening portions 120 and the second fastening portions 220 is maintained, and fastening rigidity between the first cover 100 and the second cover 200 is secured.

Further, the inner walls 130 may be formed to have a greater height than the heights of the first outer walls 110 of the first cover 100 and the second outer walls 210 of the second cover 200.

That is, the first outer walls 110 and the second outer walls 210 come into contact with each other to form the height of the space formed in the airbag housing.

Therefore, if the height of the inner walls 130 is smaller than the height of the first outer walls 110 or the second outer walls 210, the airbag cushion may expand beyond the inner walls 130 towards the outer walls 110 and 210.

Accordingly, by forming the inner walls 130 to have a greater height than the heights of the first outer walls 110 and the second outer walls 210, the inner walls 130 may stably perform a role as a guide of the airbag cushion while preventing the airbag cushion from expanding toward the outer walls 110 and 210.

Further, the inner walls 130 may be formed in the shape of a plate so that one end of each of the inner walls 130 is fixed to the inner surface of the first cover 100 or the inner surface of the second cover 200, and the other end of each of the inner walls 130 protrudes toward the cover 200 or 100 facing the inner walls 130.

For example, as shown in FIGS. 2 and 4, one end of the inner wall 130 may be a fixed end that is fixed to the bottom surface of the second cover 200, and the other end of the inner wall 130 may be a free end that protrudes toward the first cover 100.

Furthermore, the inner walls 130 may be supported vertically on the inner surface of the first cover 100 and the inner surface of the second cover 200.

That is, one end of the inner wall 130 may be fixed vertically to the bottom surface of the first cover 100, and the other end of the inner wall 130 may protrude toward the second cover 200 and be supported vertically on the ceiling surface of the second cover 200.

Therefore, the inner walls 130 function as ribs that reinforce rigidity of the airbag housing, thereby increasing the supporting rigidity of the airbag housing.

As described above, in the present disclosure, the airbag housing is assembled through hook fastening between the first cover 100 and the second cover 200 that are separated independently, thereby improving the assembly performance of the airbag housing and reducing manufacturing costs.

Further, the upper surface of the airbag housing is rotated in the hinge structure by the fracture part 230 and the fracture dispersion parts 240 to be opened, thereby improving the deployment performance of the airbag cushion.

As is apparent from the above description, according to the present disclosure, an airbag housing is assembled through a hook fastening structure between a first cover and a second cover that are provided independently separately, thereby being capable of improving assemblability of an airbag housing product and reducing manufacturing costs.

Further, the upper surface of the airbag housing is rotated in a hinge structure by a fracture part and fracture dispersion parts to be opened, thereby improving the deployment performance of the airbag cushion.

Effects obtained by the present disclosure are not limited to the effects mentioned above, and other effects not mentioned may be clearly understood by those skilled in the art to which the present disclosure pertains from the above description.

While the present disclosure has been explained in relation to specific embodiments, it is to be understood that various modifications and changes thereof will become apparent to those skilled in the art without departing from the technical spirit of the present disclosure as provided by the appended claims.

What is claimed is:

1. An airbag housing comprising:
a first cover including first fastening portions formed along a circumference of the first cover; and
a second cover including:
second fastening portions formed along a circumference of the second cover and configured to engage with the first fastening portions and fasten to the first cover;
a fracture part formed in a portion of the second cover and configured to reduce rigidity; and
fracture dispersion parts formed at ends of the fracture part, the fracture dispersion parts configured to disperse fracture force to prevent cutting of other portions of the second cover other than the fracture part,
wherein a thickness of portions of the second cover where the fracture distribution parts are formed is greater than a thickness of a remaining portion of the second cover.

2. The airbag housing of claim 1, wherein each of the fracture dispersion parts is formed in a shape of a hole configured to penetrate the second cover.

3. The airbag housing of claim 1, wherein each of the fracture dispersion parts is formed in a shape of a circular hole.

4. The airbag housing of claim 1,
wherein the first cover further includes outer walls formed around the circumference thereof and the circumference of the second cover,
wherein the first fastening portions and the second fastening portions are respectively formed on the outer walls of the first cover and the outer walls of the second cover, and wherein the first cover further includes inner walls provided inside the outer walls so that a space is created by the inner walls.

5. The airbag housing of claim 4, wherein the inner walls are disposed inside fastening areas between the first fastening portions and the second fastening portions.

6. The airbag housing of claim 4, wherein the inner walls are disposed adjacent to the first fastening portions and the second fastening portions.

7. The airbag housing of claim 4, wherein the inner walls are formed to have a height greater than that of the outer walls of the first cover and the outer walls of the second cover.

8. The airbag housing of claim 4, wherein the inner walls are formed in a shape of a plate so that one end of each of the inner walls is fixed to an inner surface of one of the first cover and the second cover, and a remaining end of each of the inner walls protrudes toward a remaining one of the first cover, and
wherein the second cover configured to face the inner walls.

9. The airbag housing of claim 4, wherein the inner walls are supported vertically on an inner surface of the first cover and an inner surface of the second cover.

10. The airbag housing of claim 1, wherein the second fastening portions of the second cover engage with the first fastening portions of the first cover as a hook fastening structure.

11. The airbag housing of claim 10, wherein at least one of:
the first fastening portions include hooks and the second fastening portions include hook groves; or
the first fastening portions include hook grooves and the second fastening portions include hooks, and
wherein the first fastening portions are fastened to the second fastening portions to form the hook fastening structure.

12. The airbag housing of claim 1, wherein the fracture part is configured as a tear line shaped as a broken line to reduce rigidity of the fracture part.

13. The airbag housing of claim 12, wherein the fracture part has a U-shape.

* * * * *